May 3, 1927.                    S. H. BROOKS                    1,626,782
SWING PIPE MECHANISM
Filed May 10, 1924
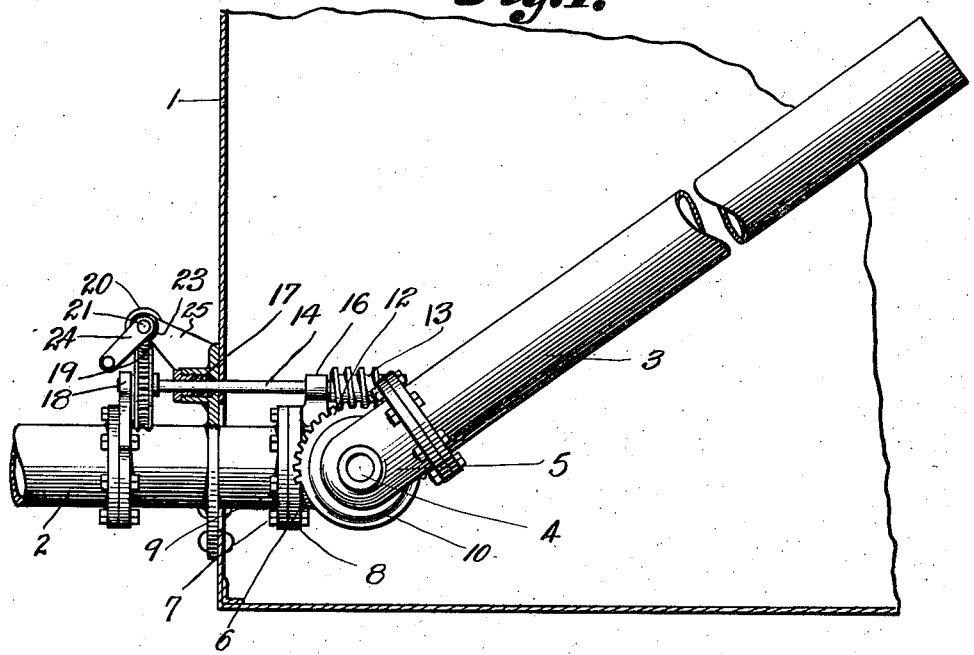
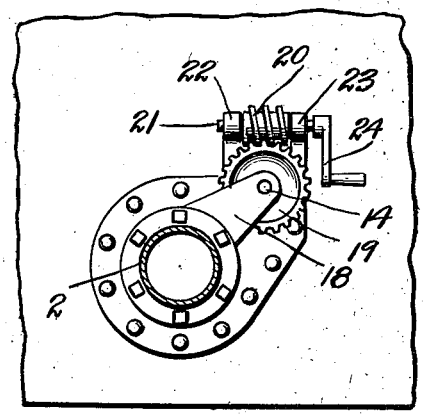
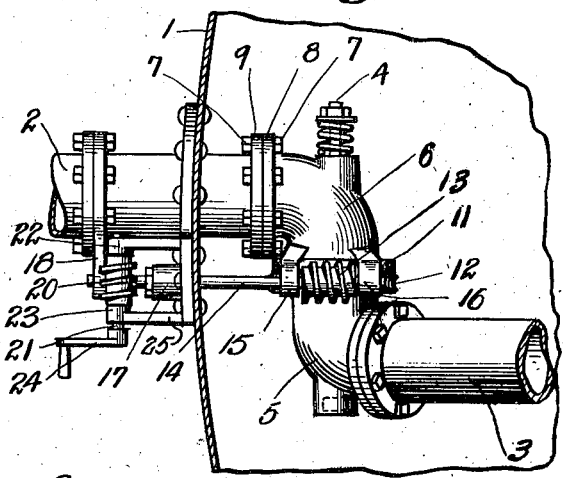
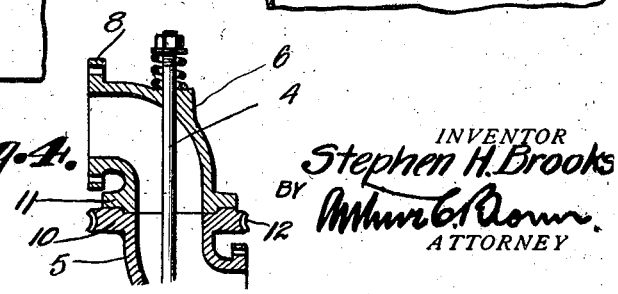
INVENTOR
Stephen H. Brooks
BY
ATTORNEY Patented May 3, 1927.

1,626,782

UNITED STATES PATENT OFFICE.

STEPHEN H. BROOKS, OF CLEVELAND, OHIO, ASSIGNOR TO THE OIL CONSERVATION ENGINEERING COMPANY, OF CLEVELAND, OHIO, A CORPORATION OF OHIO.

SWING-PIPE MECHANISM.

Application filed May 10, 1924. Serial No. 712,489.

This invention relates to swing pipes and means for operating them.

Ordinarily swing pipes used in oil storage tanks are operated by cables which pass through the roof of the tank. My invention contemplates a geared control whereby the swing pipe can be operated from the ground and the invention consists in certain novel parts and combinations of parts, all of which will be specifically referred to hereinafter, reference being had to the accompanying drawings, in which—

Fig. 1 is a sectional view through a portion of an oil tank to which my invention is applied, the swing pipe, the line pipe and the operating mechanism being shown in elevation.

Fig. 2 is an end view of the invention.

Fig. 3 is a top view of the invention, and

Fig. 4 is a sectional view through the swing pipe connection.

The tank 1 may be of any preferred construction provided with the usual line pipe 2 having a swing pipe 3 connected thereto by a headed rod 4 which passes through the union or fitting 6 fastened to the pipe 2 by fastening devices 7 which pass through the flange 8 of the member 6 and through the flange 9 of the pipe 2. The curved portion 5 may be a fitting separate from the pipe 3 and it is shown as provided with a flange 10 which fits against the flange 11 on the member 6, the flange 10 being provided at its periphery with worm gear teeth 12 which are engaged by the worm 13 on shaft 14.

The shaft 14 is mounted in bearings 15 and 16 and it extends through the gland or packing 17 carried by the wall of the tank 1, the outer end of the shaft 14 being mounted in a bearing 18 carried by the pipe 2. The outer end of the shaft 14 is provided with a worm gear 19 which meshes with a worm 20 on shaft 21 mounted in bearings 22 and 23 carried by the bracket 25 fast to the wall of the tank 1. The shaft 21 is provided with a crank 24 by means of which the shaft can be turned.

When the shaft 21 is turned, it will rotate the worm 20 imparting a rotary motion to worm gear 19 causing the shaft 14 to turn and thereby rotating worm 13 so that the worm 13 will rotate the worm gear 12 to swing the pipe 3 in an upward or downward direction dependent upon the direction of rotation of the shaft 21. Therefore the swing pipe 3 may be operated from a point adjacent to the ground without the necessity of employing cables or the like as has heretofore been the general practice.

It will be apparent from the foregoing that the power may be applied on the outside of the tank adjacent to the ground and communicated by relatively short power transmission mechanism to the interior of the tank to rotate the swing pipe and inasmuch as a double worm gear mechanism is employed to multiply the power from the power end of the shaft to the delivery end, very little power will be required for the shaft 21.

What I claim and desire to secure by Letters Patent is:

1. In combination with a tank, a substantially horizontal line pipe extending to the interior of the tank near the bottom thereof and having a laterally directed right angle turn at its inner end provided with a seat portion, an elongated swing pipe within the tank having a laterally directed right angle turn at its lower end provided with a seat portion, the other end of said elongated pipe being free, means yieldingly retaining said seat portions in co-operative relation to support said elongated pipe at its lower end, a shaft extending through the tank and having worm gear connection with the swing pipe and operating means on the exterior of the tank having worm gear connection with the shaft to rotate the swing pipe.

2. In combination with a tank, a substantially horizontal line pipe extending to the interior of the tank near the bottom thereof, an elbow on the inner end of the pipe having an end flange provided with a seat, an elongated swing pipe within the tank, a laterally extending elbow on the lower end of the swing pipe having an end flange rotatably mounted in the seat of the line pipe elbow flange and having worm threads in its periphery, a spring pressed rod extending through said elbows to retain their seating relation to support said elongated pipe at its lower end and permit the swing pipe to rotate, a rod extending through the tank having a worm in engagement with the worm threads on the swing pipe elbow flange and means exterior to the tank for operating the shaft.

In testimony whereof I affix my signature.

STEPHEN H. BROOKS.